United States Patent
Du et al.

(10) Patent No.: US 10,797,533 B2
(45) Date of Patent: Oct. 6, 2020

(54) WIRELESS POWER TRANSMISSION DEVICE

(71) Applicant: Delta Electronics (Thailand) Public Company Limited, Samutprakarn (TH)

(72) Inventors: Shuailin Du, Samutprakarn (TH); Yongkai Liao, Samutprakarn (TH); Kai Dong, Samutprakarn (TH); Jinfa Zhang, Samutprakarn (TH)

(73) Assignee: DELTA ELECTRONICS (THAILAND) PUBLIC COMPANY, LIMITED, Samutprakarn (TH)

( * ) Notice: Subject to any disclaimer, the term of this patent is extended or adjusted under 35 U.S.C. 154(b) by 364 days.

(21) Appl. No.: 15/909,415

(22) Filed: Mar. 1, 2018

(65) Prior Publication Data

US 2018/0254672 A1 Sep. 6, 2018

(30) Foreign Application Priority Data

Mar. 2, 2017 (CN) .......................... 2017 1 0121148

(51) Int. Cl.
| | |
|---|---|
| *H01M 10/46* | (2006.01) |
| *H02J 50/40* | (2016.01) |
| *H02J 50/10* | (2016.01) |
| *H02J 7/02* | (2016.01) |
| *H02J 50/50* | (2016.01) |
| *H02J 50/80* | (2016.01) |
| *H02J 50/12* | (2016.01) |

(52) U.S. Cl.
CPC .............. *H02J 50/40* (2016.02); *H02J 7/025* (2013.01); *H02J 50/10* (2016.02); *H02J 50/12* (2016.02); *H02J 50/50* (2016.02); *H02J 50/80* (2016.02)

(58) Field of Classification Search
CPC ........ H02J 7/0003; H02J 7/007; H02J 7/0052; H02J 2007/0059; H02J 50/40; H02J 50/12
USPC ................................. 320/108, 128, 137, 140
See application file for complete search history.

(56) References Cited

U.S. PATENT DOCUMENTS

| | | | | |
|---|---|---|---|---|
| 2014/0375251 | A1* | 12/2014 | Sakai | .................... H02M 7/537 320/107 |
| 2016/0079772 | A1* | 3/2016 | Kato | ....................... H02J 5/005 307/104 |

* cited by examiner

*Primary Examiner* — Edward Tso
(74) *Attorney, Agent, or Firm* — Kirton McConkie; Evan R. Witt (57) ABSTRACT

A wireless power transmission device includes a contactless transmitter unit, a contactless receiver unit and a step-down transformer. The transmitter unit receives an input AC power. A receiver coil of the receiver unit and a transmitter coil of the transmitter coil are electromagnetically coupled with each other. The input AC power is electromagnetically coupled to the receiver coil through the transmitter coil. Consequently, the input AC power is converted into a first output AC power. A first coil and a second coil of the step-down transformer are electromagnetically coupled with each other. The first coil is electrically connected with the receiver coil to receive the first output AC power. A second output AC power is outputted from the second coil. A turn ratio of the first coil to the second coil is larger than a turn ratio of the transmitter coil to the receiver coil.

18 Claims, 9 Drawing Sheets

WIRELESS POWER TRANSMISSION DEVICE

CROSS-REFERENCE TO RELATED APPLICATION

This application claims priority to China Patent Application No. 201710121148.4, filed on Mar. 2, 2017, the entire content of which is incorporated herein by reference for all purposes.

FIELD OF THE DISCLOSURE

The present disclosure relates to a power transmission device, and more particularly to a wireless power transmission device.

BACKGROUND OF THE DISCLOSURE

With increasing development of science and technology, wireless power transmission devices have been widely used. The wireless power transmission device includes a wireless power transmission part (e.g. a contactless transformer), which comprises a transmitter unit and a receiver unit separated with each other spatially, so the wireless power transmission device can provide safer, more reliable and more convenient electric power, when compared with a wired power supply device.

Generally, the wireless power transmission devices transmit the electric power through electromagnetic induction. In other words, the transmitter unit and the receiver unit are electromagnetically coupled with each other.

Conventionally, the wireless power transmission devices could be classified into two kinds. The first kind of the wireless power transmission device further comprises a DC-to-DC converter to achieve voltage conversion, while the second kind of the wireless power transmission device has to use the wireless power transmission part to achieve the voltage conversion. In detail, if a required output voltage changes, for the first kind of the wireless power transmission device, the DC- to DC converter could be redesigned to meet the requirement, alternatively, for the second kind of the wireless power transmission device, the wireless transmission part has to be redesigned.

In addition, the above two kinds of the wireless power transmission devices still have some drawbacks. For example, in the first kind, the DC-to-DC converter is usually a phase-shifting circuit or a LLC resonant circuit, highly increasing design complexity, component quantity and device volume. Namely, the first kind of the wireless power transmission device has high cost, low efficiency and large volume. In the second kind, taking a contactless transformer for an example, the design of the contactless transformer is much more difficult than a traditional transformer in the wired power supply device, since the wireless power transmission efficiency and construction should be taken into consideration. Moreover, such design is non-reusable and costly if the required output voltage changes. Besides, if the difference between the input voltage and the output voltage is too large, the inductance of the low-voltage side coil is low, and the low-voltage side is more sensitive to production errors and parasitic parameters. Consequently, operations of the wireless power transmission are adversely affected.

Above all, there is a need of providing an improved wireless power transmission device in order to overcome the above drawbacks.

SUMMARY OF THE DISCLOSURE

An object of the present disclosure provides a wireless power transmission device with low cost, reduced volume, and enhanced efficiency.

In accordance with an aspect of the present disclosure, there is provided a wireless power transmission device. The wireless power transmission device includes a contactless transmitter unit, a contactless receiver unit and a step-down transformer. The contactless transmitter unit receives an input AC power. The contactless transmitter unit includes a transmitter coil. The contactless receiver unit includes a receiver coil. The receiver coil and the transmitter coil are electromagnetically coupled with each other. The input AC power is electromagnetically coupled to the receiver coil through the transmitter coil. Consequently, the input AC power is converted into a first output AC power. The step-down transformer includes a first coil and a second coil. The first coil and the second coil are electromagnetically coupled with each other. The first coil is electrically connected with the receiver coil to receive the first output AC power. A second output AC power is outputted from the second coil. A turn ratio of the first coil to the second coil is larger than a turn ratio of the transmitter coil to the receiver coil.

In accordance with another aspect of the present disclosure, there is provided a wireless power transmission device. The wireless power transmission device includes a step-up transformer, a contactless transmitter unit and a contactless receiver unit. The step-up transformer includes a first coil and a second coil. The first coil and the second coil are electromagnetically coupled with each other. The second coil receives a first input AC power. A second input AC power is outputted from the first coil. The contactless transmitter unit is electrically connected with the first coil to receive the second input AC power. The contactless transmitter unit includes a transmitter coil. The contactless receiver unit includes a receiver coil. The receiver coil and the transmitter coil are electromagnetically coupled with each other. The second input AC power is electromagnetically coupled to the receiver coil through the transmitter coil. Consequently, the second input AC power is converted into an output AC power. A turn ratio of the first coil to the second coil is larger than a turn ratio of the receiver coil to the transmitter coil.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
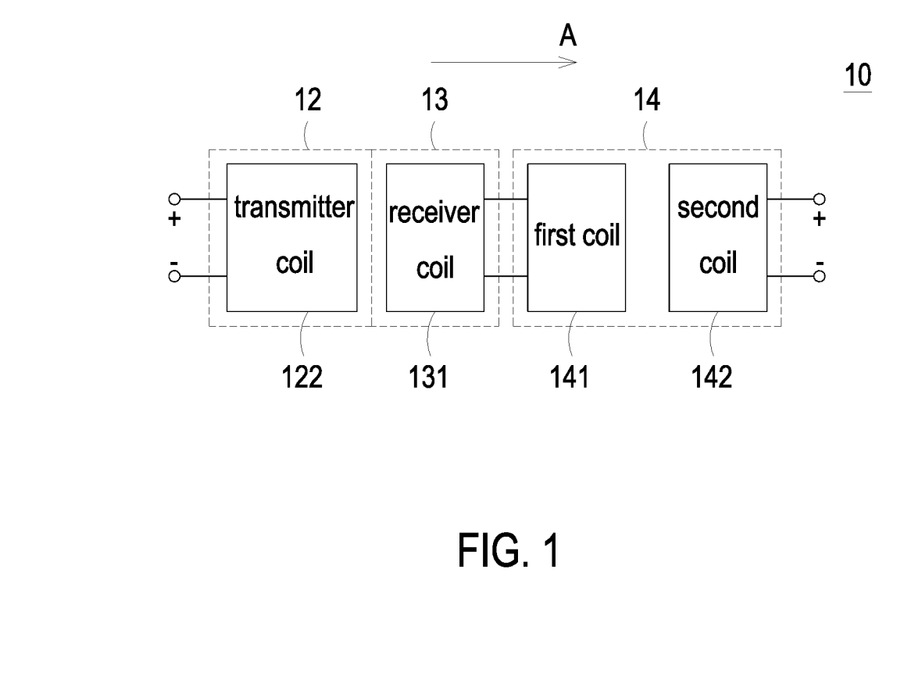
FIG. 1 is a schematic block diagram illustrating an architecture of a wireless power transmission device according to a first embodiment of the present disclosure.

FIG. 1 is a schematic block diagram illustrating an architecture of a wireless power transmission device according to a first embodiment of the present disclosure. As shown in FIG. 1, the wireless power transmission device 10 is a magnetically-inductive wireless power transmission device. The wireless power transmission device 10 is used for transmitting electric power through an electromagnetic coupling effect, which uses wireless transmission manner to convert a higher-voltage to a lower-voltage for a load. Moreover, in an embodiment, the wireless power transmission device 10 comprises a contactless transmitter unit 12, a contactless receiver unit 13 and a step-down transformer 14. As shown in FIG. 1, the electric power is transmitted along the direction indicated by the arrow A.

The contactless transmitter unit 12 receives an input AC power. Moreover, the contactless transmitter unit 12 comprises a transmitter coil 122. The contactless receiver unit 13 comprises a receiver coil 131. The receiver coil 131 and the transmitter coil 122 interact with each other to generate an electromagnetic coupling effect. That is, a contactless transformer is defined by the receiver coil 131 and the transmitter coil 122 collaboratively. According to the electromagnetic coupling effect, the input AC power is transmitted to the receiver coil 131 through the transmitter coil 122. Consequently, the input AC power is converted into a first output AC power, and the first output AC power is outputted from the receiver coil 131. In an embodiment, each of the receiver coil 131 and the transmitter coil 122 comprises a winding. In another embodiment, at least one of the receiver coil 131 and the transmitter coil 122 further comprises a magnetic core.

The step-down transformer 14 comprises a first coil 141 and a second coil 142. The first coil 141 and the second coil 142 are electromagnetically coupled with each other. The first coil 141 is electrically connected with the contactless receiver unit 13 to receive the first output AC power. The second coil 142 is electrically connected with a load (not shown). According to the electromagnetic coupling effect, the first output AC power from the first coil 141 is converted into a second output AC power and outputted by the second coil 142. Unlike the contactless transformer, the first coil 141 and the second coil 142 of the step-down transformer 14 are not apart spatially and are disposed on the receiving side together. In an embodiment, a turn ratio of the first coil 141 to the second coil 142 is larger than a turn ratio of the transmitter coil 122 to the receiver coil 131.

From the above descriptions, the transmitter coil 122 and the receiver coil 131 of the wireless power transmission device 10 are used to achieve wireless power transmission. Moreover, the first output AC power from the contactless receiver unit 13 is converted into the second output AC power by the step-down transformer 14. The second output AC power is provided to the load. Since the turn ratio of the first coil 141 to the second coil 142 is larger than the turn ratio of the transmitter coil 122 to the receiver coil 131, the process of adjusting the voltage from the input to the load is performed mainly by the step-down transformer 14. That is, the difference between the turn number of the transmitter coil 122 and the turn number of the receiver coil 131 is small. Since the complexities of designing and producing the transmitter coil 122 and the receiver coil 131 are reduced, the fabricating cost is decreased. Preferably but not exclusively, the turn ratio of the transmitter coil 122 to the receiver coil 131 is in the range between 1 and 2. Since the step-down transformer 14 can be designed and produced more easily, the second output AC power required by the load could be easily changed by adjusting the turn ratio of the first coil 141 to the second coil 142. In other words, the step-down transformer 14 can be varied easily according to the practical requirements of the load.

It is noted that the electric power received by the wireless power transmission device 10 and the electric power outputted from the wireless power transmission device 10 are not restricted to the AC input power and the AC output power. For example, the electric power received by the wireless power transmission device and the electric power outputted from the wireless power transmission device are DC input power and DC output power.

Figure 2:
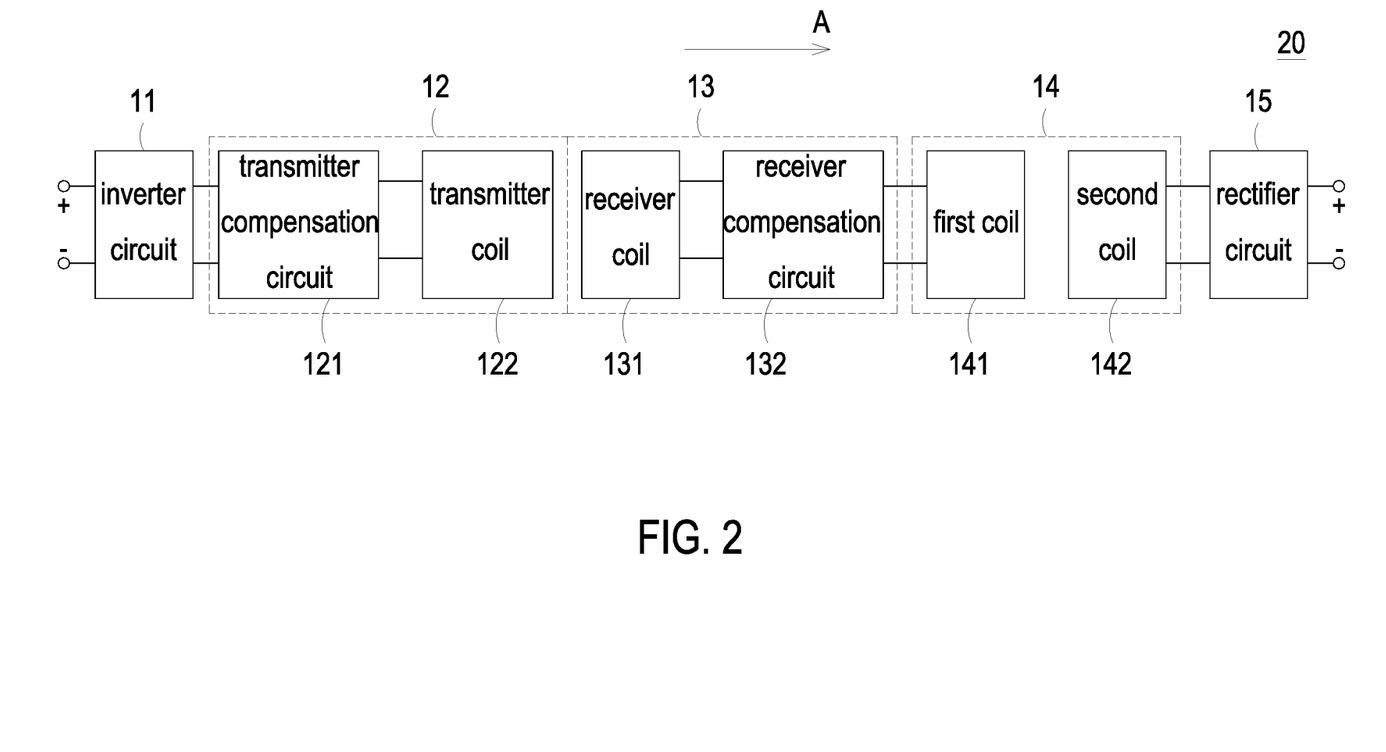
FIG. 2 is a schematic block diagram illustrating an architecture of a wireless power transmission device according to a second embodiment of the present disclosure.

FIG. 2 is a schematic block diagram illustrating an architecture of a wireless power transmission device according to a second embodiment of the present disclosure. Component parts and elements corresponding to those of the first embodiment are designated by identical numeral references, and detailed description thereof is omitted. In comparison with the first embodiment, the wireless power transmission device 20 of this embodiment receives an input DC power and generates an output DC power. Moreover, the wireless power transmission device 20 further comprises an inverter circuit 11 and a rectifier circuit 15. Moreover, the contactless transmitter unit 12 further comprises a transmitter compensation circuit 121, and the contactless receiver unit 13 further comprises a receiver compensation circuit 132.

The inverter circuit 11 receives an input DC power and converts the input DC power into an input AC power. The input AC power is provided to the contactless transmitter unit 12. The transmitter compensation circuit 121 is electrically connected between the inverter circuit 11 and the transmitter coil 122. The transmitter compensation circuit 121 is used for compensating reactive power of the transmitter coil 122 and reducing power capability of the input AC power. Consequently, the power transmission efficiency is enhanced. The receiver compensation circuit 132 is electrically connected between the receiver coil 131 and the first coil 141. The receiver compensation circuit 132 is used for compensating the reactive power of the receiver coil 131 and reducing the power capability of the first output AC power. Consequently, the power transmission efficiency is further enhanced. The input port of the rectifier circuit 15 is electrically connected with the second coil 142. The output port of the rectifier circuit 15 is electrically connected with the load such as a DC load. The rectifier circuit 15 is used for rectifying the second output AC power into the output DC power.

It is noted that numerous modifications and alterations may be made while retaining the teachings of the disclosure. In some embodiments, the transmitter compensation circuit 121 and receiver compensation circuit 132 as shown in FIG. 2 are included in the wireless power transmission device 10 of FIG. 1. In some other embodiments, only one of the transmitter compensation circuit 121 and the receiver compensation circuit 132 is included in the wireless power transmission device 10. In some other embodiments, the transmitter compensation circuit 121 and receiver compensation circuit 132 are not included in the wireless power transmission device 20, under this circumstance, the transmitter coil 122 is directly connected with the inverter circuit 11, and the receiver coil 131 is directly connected with the first coil 141.

Figure 3:
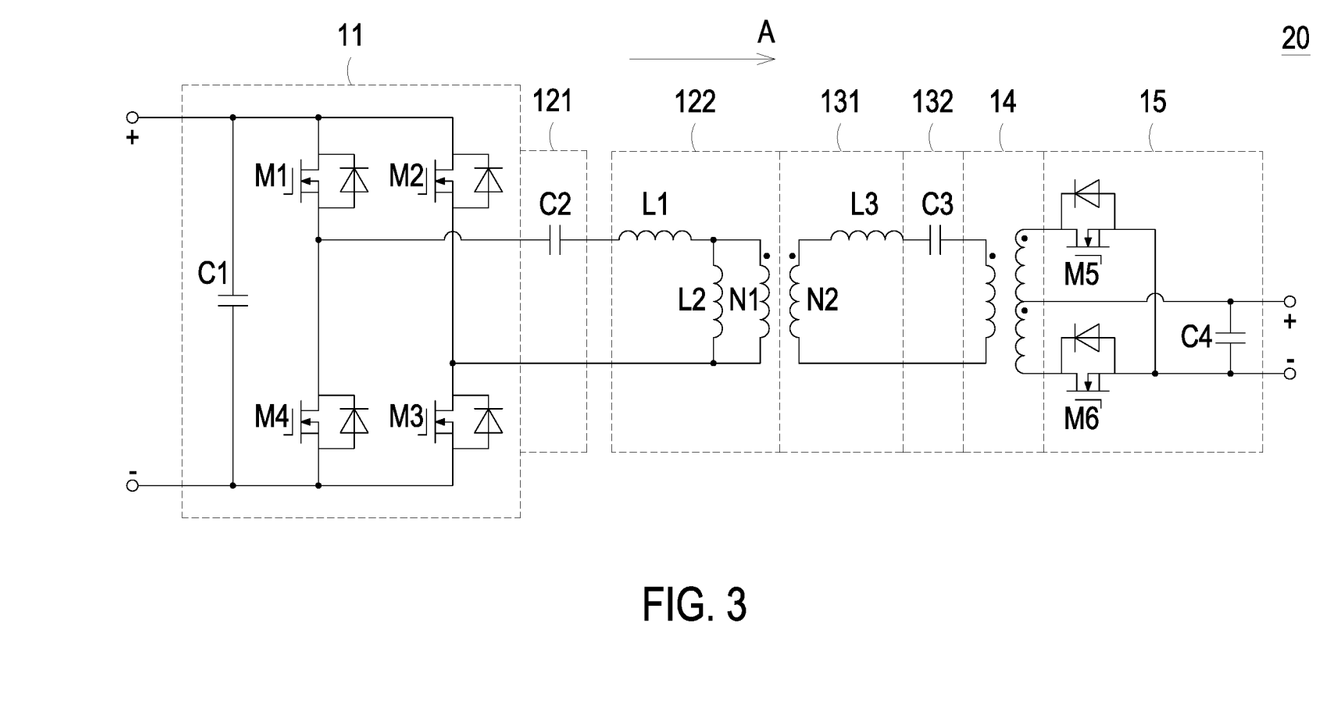
FIG. 3 is a schematic circuit diagram of the wireless power transmission device according to the second embodiment of the present disclosure.

FIG. 3 is a schematic circuit diagram of the wireless power transmission device according to the second embodiment of the present disclosure. The inverter circuit 11 comprises switch elements M1, M2, M3, M4 and a capacitor C1. The switch elements M1, M2, M3 and M4 are collaboratively formed as a full-bridge circuit. The capacitor C1 is electrically connected with the input port of the full-bridge circuit in parallel. The transmitter compensation circuit 121 comprises a capacitor C2. The capacitor C2 is electrically connected between the inverter circuit 11 and the transmitter coil 122 in series. In other words, the transmitter compensation circuit 121 is a serially-coupled capacitor for compensating the reactive power. It is noted that the structure of the transmitter compensation circuit 121 is not restricted. For example, in another embodiment, the transmitter compensation circuit 121 comprises a parallel-coupled capacitor or comprises an inductor/capacitor structure. In case that the transmitter compensation circuit 121 comprises the parallel-coupled capacitor, the capacitor is electrically connected with the input port of the transmitter coil 122 in parallel. In case that the transmitter compensation circuit 121 comprises the inductor/capacitor structure, the transmitter compensation circuit 121 may comprise a first capacitor, a second capacitor and an inductor. The inductor is electrically connected with the input port of the transmitter coil 122 in series. The first capacitor is electrically connected with the input port of the transmitter coil 122 in parallel. The second capacitor is electrically connected with the input port of the transmitter coil 122 in series.

The equivalent circuits of the transmitter coil 122 and the receiver coil 131 are also shown in FIG. 3. The transmitter coil 122 and the receiver coil 131 are equivalent to an ideal transformer comprising a transmitter leakage inductor L1, a receiver leakage inductor L3 and a transmitter magnetizing inductor L2. Moreover, N1 is the turn number of the transmitter coil, and N2 is the turn number of the receiver coil. The receiver compensation circuit 132 comprises a capacitor C3. The capacitor C3 is electrically connected between the receiver coil 131 and the step-down transformer 14 in series. In other words, the receiver compensation circuit 132 is a serially-coupled capacitor for compensating the reactive power. It is noted that the structure of the receiver compensation circuit 132 is not restricted. For example, in another embodiment, the receiver compensation circuit 132 comprises a parallel-coupled capacitor or comprises an inductor/capacitor structure. In case that the receiver compensation circuit 132 comprises the parallel-coupled capacitor, the capacitor is electrically connected with the output port of the receiver coil 131 in parallel. In case that the receiver compensation circuit 132 comprises the inductor/capacitor structure, the receiver compensation circuit 132 may comprise a first capacitor, a second capacitor and an inductor. The inductor is electrically connected with the output port of the receiver coil 131 in series. The first capacitor is electrically connected with the output port of the receiver coil 131 in parallel. The second capacitor is electrically connected with the output port of the receiver coil 131 in series.

Preferably but not exclusively, the step-down transformer 14 is a transformer with a center tap in FIG. 3. Alternatively, the step-down transformer 14 is a transformer with two output terminals in another embodiment. The rectifier circuit 15 comprises switch elements M5, M6 and a capacitor C4. The switch elements M5 and M6 are collaboratively formed as a full-wave rectifier circuit. The capacitor C4 is electrically connected with the output port of the full-wave rectifier circuit in parallel. In an embodiment, the switch elements M5 and M6 are MOSFET transistors for performing synchronous rectification. Therefore, the rectifier circuit 15 may have a simple circuitry of a driving circuit. Alternatively, each of the switch elements M5 and M6 could be a diode for performing rectification. It is noted that the components of the wireless power transmission device are not restricted. In other words, the circuits with the similar functions are also feasible.

Figure 4A:
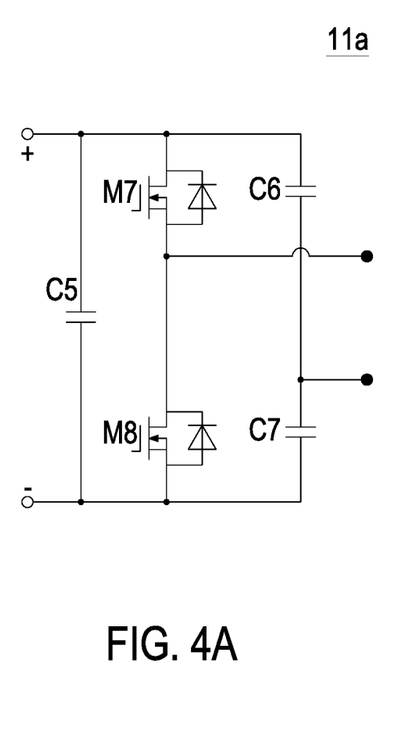
FIG. 4A is a schematic circuit illustrating a variant example of the inverter circuit of the wireless power transmission device according to the second embodiment of the present disclosure.

The inverter circuit used in the wireless power transmission device is not restricted to the full-bridge inverter circuit in FIG. 3. In some embodiments, the inverter circuit is a half-bridge inverter circuit. FIG. 4A is a schematic circuit illustrating a variant example of the inverter circuit of the wireless power transmission device according to the second embodiment of the present disclosure. As shown in FIG. 4A, the inverter circuit 11a comprises capacitors C5, C6, C7 and switch elements M7, M8. The switch elements M7 and M8 are collaboratively formed as a half-bridge circuit. A second terminal of the switch element M7 is electrically connected with a first terminal of the switch element M8. The capacitor C6 is electrically connected with a first terminal of the switch element M7. The capacitor C7 is electrically connected with a second terminal of the switch element M8 and the capacitor C6. The capacitor C5 is electrically connected with the input port of the half-bridge circuit in parallel.

Figure 4B:
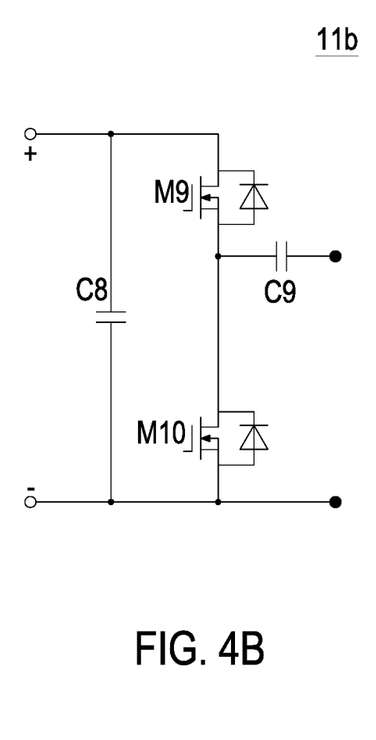
FIG. 4B is a schematic circuit illustrating another variant example of the inverter circuit of the wireless power transmission device according to the second embodiment of the present disclosure.

FIG. 4B is a schematic circuit illustrating another variant example of the inverter circuit of the wireless power transmission device according to the second embodiment of the present disclosure. As shown in FIG. 4B, the inverter circuit 11b comprises capacitors C8, C9 and switch elements M9, M10. The switch elements M9 and M10 are collaboratively formed as a half-bridge circuit. A second terminal of the switch element M9 is electrically connected with a first terminal of the switch element M10. The capacitor C9 is electrically connected with the second terminal of the switch element M9 and the first terminal of the switch element M10. The capacitor C8 is electrically connected with the input port of the half-bridge circuit in parallel.

Figure 5:
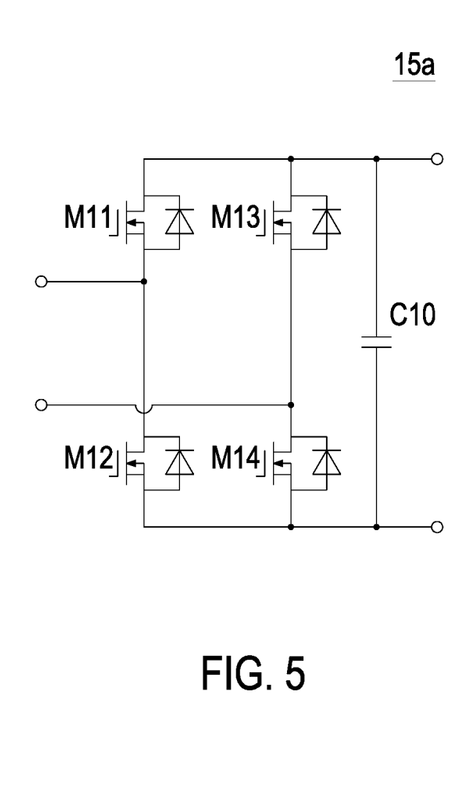
FIG. 5 is a schematic circuit illustrating a variant example of the rectifier circuit of the wireless power transmission device according to the second embodiment of the present disclosure.

The rectifier circuit used in the wireless power transmission device is not restricted to the full-wave inverter circuit in FIG. 3. FIG. 5 is a schematic circuit illustrating a variant example of the rectifier circuit of the wireless power transmission device according to the second embodiment of the present disclosure. The rectifier circuit 15a comprises switch elements M11, M12, M13, M14 and a capacitor C10. The switch elements M11, M12, M13 and M14 are collaboratively formed as a full-bridge rectifier circuit. The capacitor C10 is electrically connected with the output port of the full-bridge rectifier circuit in parallel.

Figure 6:
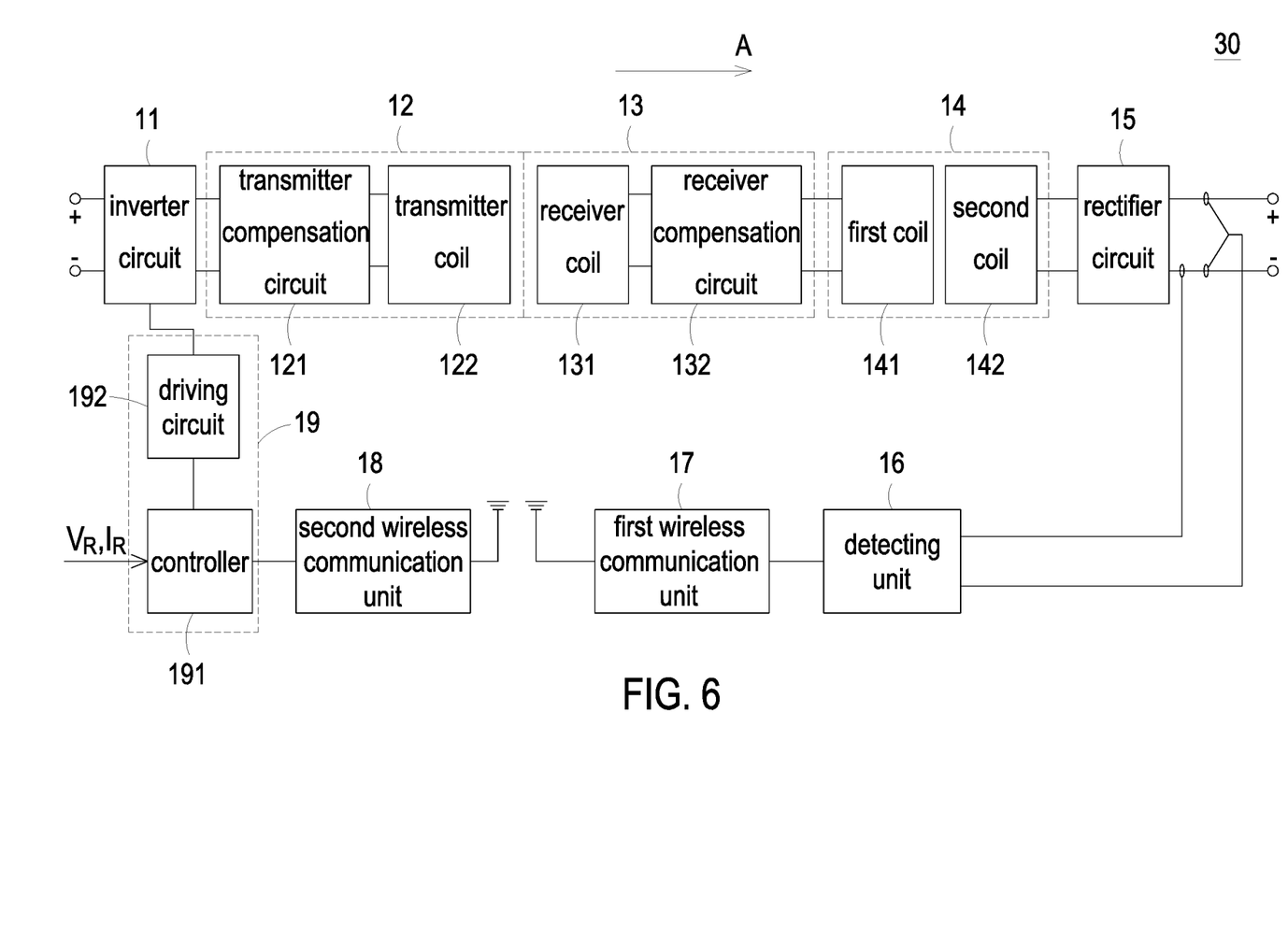
FIG. 6 is a schematic block diagram illustrating an architecture of a wireless power transmission device according to a third embodiment of the present disclosure.

FIG. 6 is a schematic block diagram illustrating the architecture of a wireless power transmission device according to a third embodiment of the present disclosure. Component parts and elements corresponding to those of the second embodiment are designated by identical numeral references, and detailed description thereof is omitted. In comparison with the second embodiment of FIG. 2, the wireless power transmission device 30 of this embodiment further comprises a detecting unit 16, a first wireless communication unit 17, a second wireless communication unit 18 and a control unit 19. The detecting unit 16 is electrically connected with the output port of the rectifier circuit 15 for detecting an output voltage and/or an output current of the output DC power. The first wireless communication unit 17 is electrically connected with the detecting unit 16. The first wireless communication unit 17 receives the detecting result of the detecting unit 16 and generates a wireless signal reflecting the output voltage and/or the output current. The second wireless communication unit 18 is in wireless communication with the first wireless communication unit 17 to receive the wireless signal from the first wireless communication unit 17.

The control unit 19 comprises a controller 191 and a driving circuit 192. The controller 191 receivers a reference voltage VR and/or a reference current IR. The controller 191 is electrically connected with the second wireless communication unit 18 for receiving the wireless signal from the first wireless communication unit 17. Moreover, the controller 191 receives the information of the output voltage and/or the output current according to the wireless signal. The control unit 19 further compares the output voltage with the reference voltage VR and/or compares the output current with the reference current IR. According to the comparing result, the control unit 19 generates a control signal corresponding to a switching frequency and/or a shift phase of the inverter circuit 11. Alternatively, the control unit 19 generates a control signal with a corresponding duty cycle in another embodiment. The driving circuit 192 is electrically connected between the controller 191 and the inverter circuit 11. According to the control signal, the driving circuit 192 controls the inverter circuit 11 to perform the corresponding operations. In other words, the wireless power transmission device 30 can control the switching frequency and/or the shift phase of the inverter circuit 11 according to the result of detecting the output voltage and/or the output current to adjust the characteristics of the output DC power. If a required output voltage level of the wireless power transmission device is unchanged, a required output DC power can be obtained simply by adjusting the operation of the inverter circuit 11. If the required output voltage level is changed, since the process of adjusting the voltage from the input to the load is performed mainly by the step-down transformer 14, the turn ratio of the step-down transformer 14 may be changed to satisfy the required output voltage level, so as to increase the converting efficiency. Moreover, in corporation with adjusting the switching frequency and/or the shift phase of the inverter circuit 11, the control unit 19 can precisely control the output DC power at last. Consequently, the transmitter coil 122 and the receiver coil 131 are not needed to be modified and re-designed according to the required output voltage level, the fabricating cost is reduced and the efficiency is enhanced.

For example, the wireless power transmission device 30 is applied to charge a battery. The voltage level of the battery is 6V, 12V or 24V. The output port of the wireless power transmission device 30 is electrically connected with the battery. For charging the battery with different voltage levels, it is not necessary to re-design the transmitter coil 122 and the receiver coil 131. By adjusting the turn ratio of the step-down transformer 14, the output voltage level of the wireless power transmission device 30 is correspondingly changed. Moreover, the switching frequency and/or the shift phase of the inverter circuit 11 are/is controlled by the control unit 19. Consequently, the wireless power transmission device 30 provides the required output DC power to the load precisely.

In the above embodiment, the first wireless communication unit 17 generates the wireless signal according to the output voltage and/or the output current, and the second wireless communication unit 18 receives the wireless signal from the first wireless communication unit 17. It is noted that numerous modifications and alterations may be made while retaining the teachings of the disclosure. For example, in another embodiment, the first wireless communication unit 17 issues a data or a command to the second wireless communication unit 18 and receives a data or a command from the second wireless communication unit 18. Alternatively, the second wireless communication unit 18 issues a data or a command to the first wireless communication unit 17 and receives a data or a command to the first wireless communication unit 17.

Figure 7:
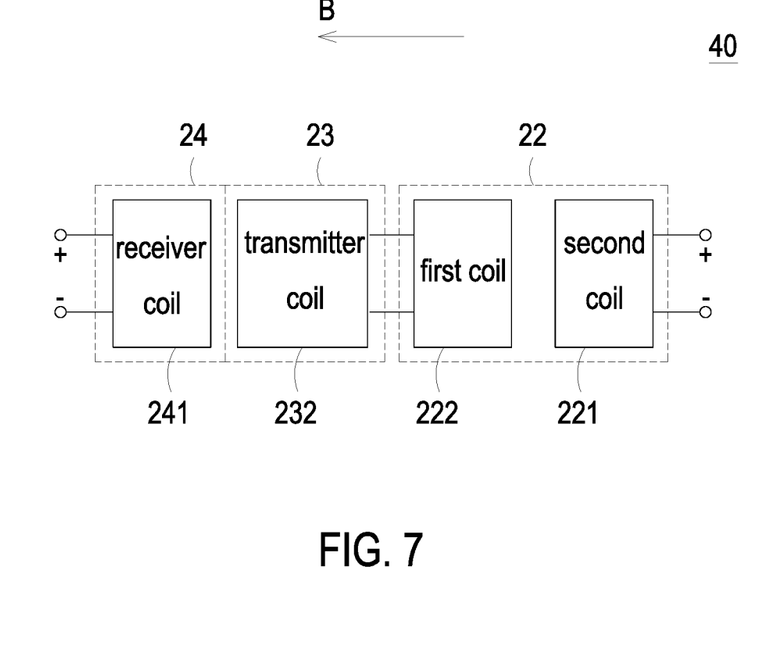
FIG. 7 is a schematic block diagram illustrating an architecture of a wireless power transmission device according to a fourth embodiment of the present disclosure.

FIG. 7 is a schematic block diagram illustrating an architecture of a wireless power transmission device according to a fourth embodiment of the present disclosure. As shown in FIG. 7, the wireless power transmission device 40 is a magnetically-inductive wireless power transmission device. The wireless power transmission device 40 is used for transmitting electric power through an electromagnetic coupling effect, which uses wireless transmission manner to convert a lower-voltage to a higher-voltage. In an embodiment, the wireless power transmission device 40 comprises a step-up transformer 22, a contactless transmitter unit 23 and a contactless receiver unit 24. As shown in FIG. 7, the electric power is transmitted along the direction indicated by the arrow B.

The step-up transformer 22 comprises a first coil 222 and a second coil 221. The first coil 222 and the second coil 221 are electromagnetically coupled with each other. The second coil 221 receives a first input AC power. According to the electromagnetic coupling effect, the first input AC power received from the second coil 221 is converted into a second input AC power by the first coil 222. The first coil 222 and the second coil 221 of the step-up transformer 22 are not apart spatially and are disposed on the transmitting side together.

The contactless transmitter unit 23 receives the second input AC power. Moreover, the contactless transmitter unit 23 comprises a transmitter coil 232. The contactless receiver unit 24 comprises a receiver coil 241. The receiver coil 241 and the transmitter coil 232 interact with each other to generate an electromagnetic coupling effect. That is, a contactless transformer is defined by the receiver coil 241 and the transmitter coil 232 collaboratively. According to the electromagnetic coupling effect, the second input AC power is transmitted to the receiver coil 241 through the transmitter coil 232. Consequently, the second input AC power is converted into an output AC power, and the output AC power is outputted from the receiver coil 241. In an embodiment, each of the transmitter coil 232 and the receiver coil 241 comprises a winding. In another embodiment, at least one of the transmitter coil 232 and the receiver coil 241 further has a magnetic core. In an embodiment, a turn ratio of the first coil 222 to the second coil 221 is larger than a turn ratio of the receiver coil 241 to the transmitter coil 232. Preferably but not exclusively, the turn ratio the receiver coil 241 to the transmitter coil 232 is in the range between 1 and 2.

It is noted that the electric power received by the wireless power transmission device 40 and the electric power outputted from the wireless power transmission device 40 are not restricted to the AC input power and the AC output power. For example, the electric power received by the wireless power transmission device and the electric power outputted from the wireless power transmission device are DC input power and DC output power.

Figure 8:
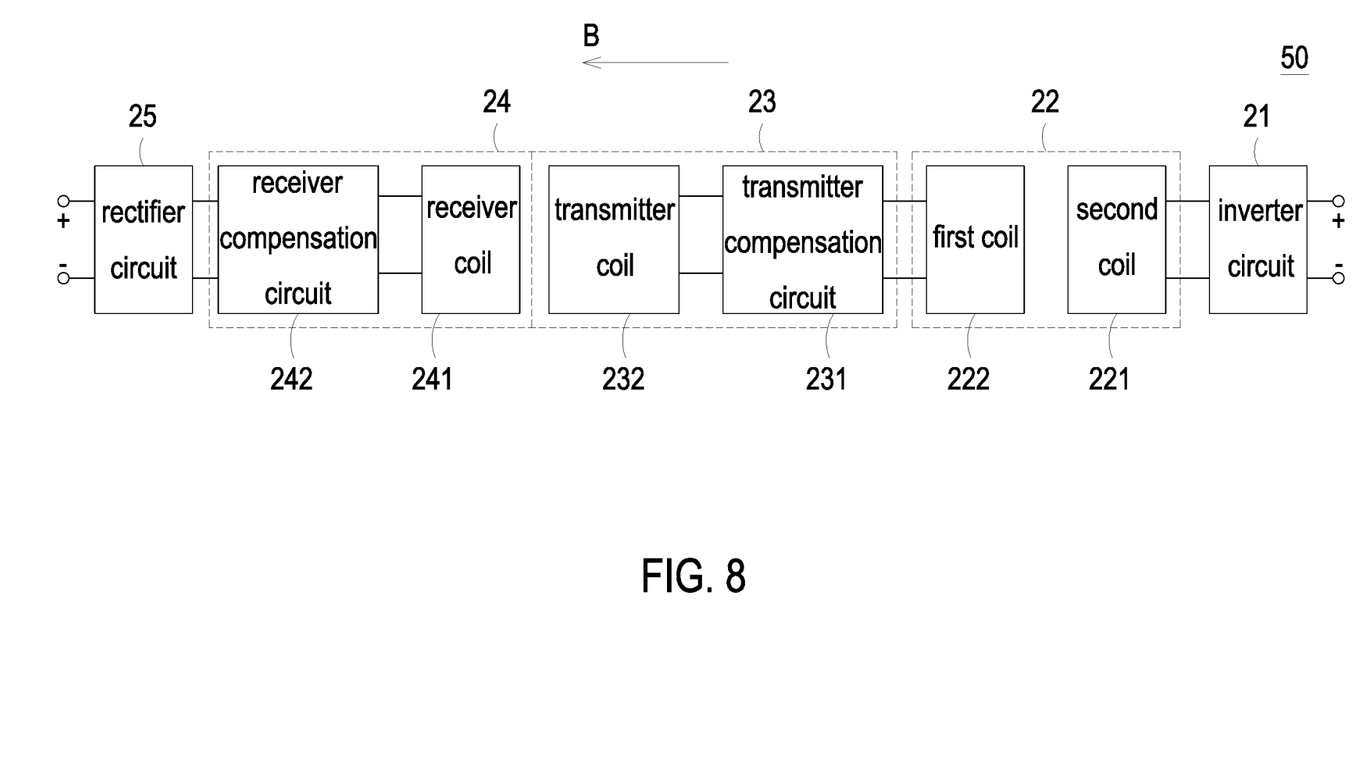
FIG. 8 is a schematic block diagram illustrating an architecture of a wireless power transmission device according to a fifth embodiment of the present disclosure.

FIG. 8 is a schematic block diagram illustrating an architecture of a wireless power transmission device according to a fifth embodiment of the present disclosure. Component parts and elements corresponding to those of the fourth embodiment are designated by identical numeral references, and detailed description thereof is omitted. In comparison with the fourth embodiment, the wireless power transmission device 50 of this embodiment receives an input DC power and generates an output DC power. Moreover, the wireless power transmission device 50 further comprises an inverter circuit 21 and a rectifier circuit 25. Moreover, the contactless transmitter unit 23 further comprises a transmitter compensation circuit 231, and the contactless receiver unit 24 further comprises a receiver compensation circuit 242.

The inverter circuit 21 receives an input DC power and converts the input DC power into the first input AC power. The first input AC power is provided to the second coil 221 of the step-up transformer 22. The transmitter compensation circuit 231 is electrically connected between the first coil 222 and the transmitter coil 232. The transmitter compensation circuit 231 is used for compensating reactive power of the transmitter coil 232 and reducing power capability of the second input AC power. Consequently, the power transmission efficiency is enhanced. The receiver compensation circuit 242 is electrically connected between the receiver coil 241 and the rectifier circuit 25. The receiver compensation circuit 242 is used for compensating reactive power of the receiver coil 241 and reducing power capability of the output AC power. Consequently, the power transmission efficiency is further enhanced. The input port of the rectifier circuit 25 is electrically connected with the receiver compensation circuit 242. The rectifier circuit 25 is used for rectifying the output AC power into the output DC power.

It is noted that numerous modifications and alterations may be made while retaining the teachings of the disclosure. In some embodiments, the transmitter compensation circuit 231 and receiver compensation circuit 242 as shown in FIG. 8 are included in the wireless power transmission device 40 of FIG. 7. In some other embodiments, only one of the transmitter compensation circuit 231 and the receiver compensation circuit 242 is included in the wireless power transmission device 40. In some other embodiments, the transmitter compensation circuit 231 and receiver compensation circuit 242 are not included in the wireless power transmission device 50, under this circumstance, the transmitter coil 232 is directly connected with the first coil 222, and the receiver coil 241 is directly connected with the rectifier circuit 25. In some embodiment, the wireless power transmission device further comprises a detecting unit, a first wireless communication unit, a second wireless communication unit and a control unit. The control unit generates a control signal corresponding to the switching frequency and/or the shift phase of the inverter circuit 21. According to the control signal, the inverter circuit performs the corresponding operation. The functions of the detecting unit, the first wireless communication unit, the second wireless communication unit and the control unit are similar to those of the third embodiment, and are not redundantly described herein.

Figure 9:
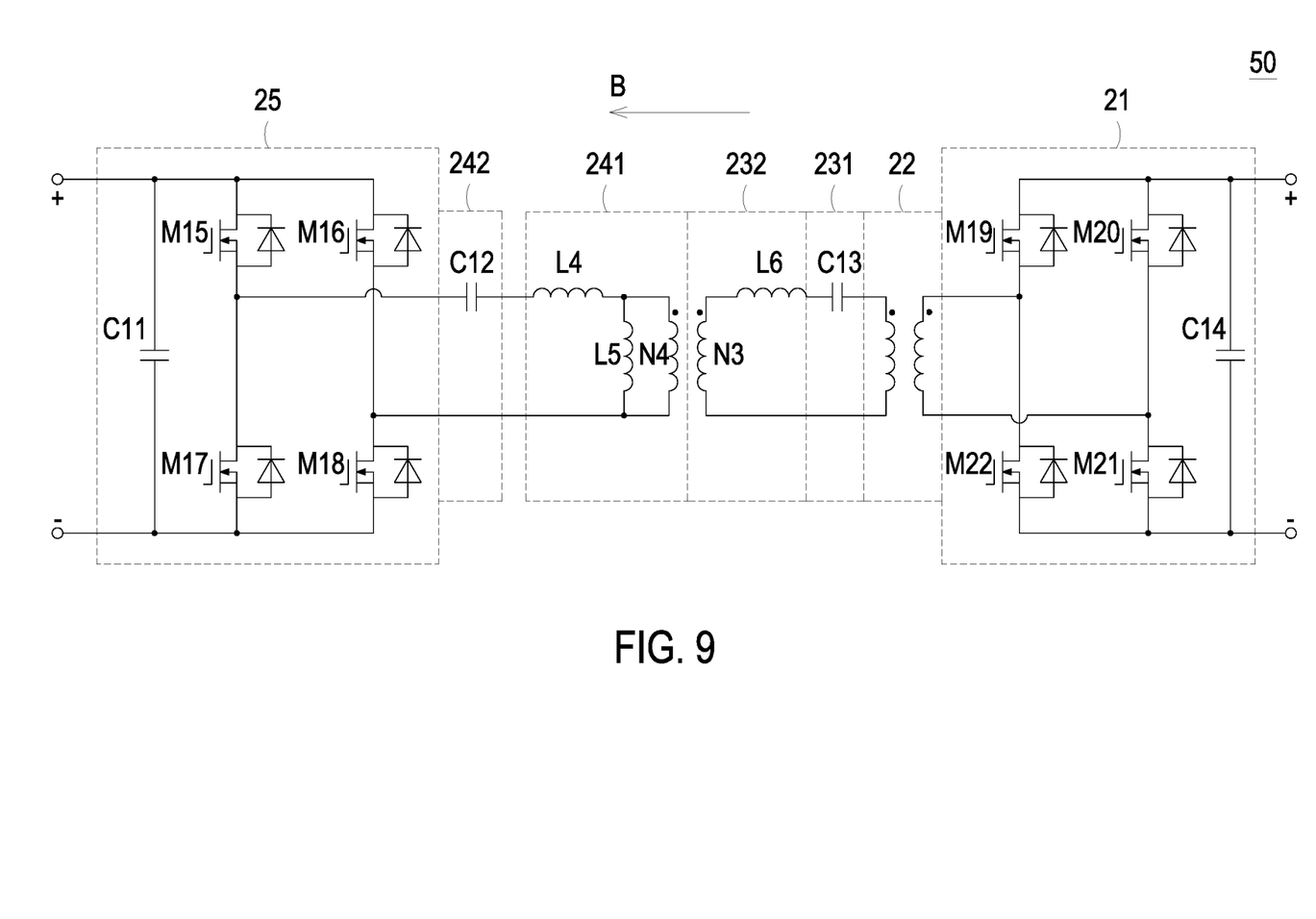
FIG. 9 is a schematic circuit diagram of the wireless power transmission device according to the fifth embodiment of the present disclosure.

FIG. 9 is a schematic circuit diagram of the wireless power transmission device according to the fifth embodiment of the present disclosure. The inverter circuit 21 comprises switch elements M19, M20, M21, M22 and a capacitor C14. The switch elements M19, M20, M21 and M22 are collaboratively formed as a full-bridge circuit. The capacitor C14 is electrically connected with the input port of the full-bridge circuit in parallel. In another embodiment, the inverter circuit 21 has a half-bridge circuit that is similar to that of FIG. 4A or FIG. 4B. Moreover, the step-up transformer 22 is a transformer with two output terminals. The transmitter compensation circuit 231 comprises a capacitor C13. The capacitor C13 is electrically connected between the step-up transformer 22 and the transmitter coil 232 in series. In other words, the transmitter compensation circuit 231 is a serially-coupled capacitor for compensating the reactive power. It is noted that the structure of the transmitter compensation circuit 231 is not restricted. For example, in another embodiment, the transmitter compensation circuit 231 comprises a parallel-coupled capacitor or comprises an inductor/capacitor structure. In case that the transmitter compensation circuit 231 comprises the parallel-coupled capacitor, the capacitor is electrically connected with the input port of the transmitter coil 232 in parallel. In case that the transmitter compensation circuit 231 comprises the inductor/capacitor structure, the transmitter compensation circuit 231 may comprise a first capacitor, a second capacitor and an inductor. The inductor is electrically connected with the input port of the transmitter coil 232 in series. The first capacitor is electrically connected with the input port of the transmitter coil 232 in parallel. The second capacitor is electrically connected with the input port of the transmitter coil 232 in series. The equivalent circuits of the transmitter coil 232 and the receiver coil 241 are also shown in FIG. 9. The transmitter coil 232 and the receiver coil 241 are equivalent to an ideal transformer comprising a transmitter leakage inductor L6, a receiver leakage inductor L4 and a receiver magnetizing inductor L5. Moreover, N3 is the turn number of the transmitter coil, and N4 is the turn number of the receiver coil. The receiver compensation circuit 242 comprises a capacitor C12. The capacitor C12 is serially electrically connected between the receiver coil 241 and the rectifier circuit 25. In other words, the receiver compensation circuit 242 is a serially-coupled capacitor for compensating the reactive power. It is noted that the structure of the receiver compensation circuit 242 is not restricted. For example, in another embodiment, the receiver compensation circuit 242 comprises a parallel-coupled capacitor or comprises an inductor/capacitor structure. In case that the receiver compensation circuit 242 comprises the parallel-coupled capacitor, the capacitor is electrically connected with the output port of the receiver coil 241 in parallel. In case that the receiver compensation circuit 242 comprises the inductor/capacitor structure, the receiver compensation circuit 242 may comprise a first capacitor, a second capacitor and an inductor. The inductor is electrically connected with the output port of the receiver coil 241 in series. The first capacitor is electrically connected with the output port of the receiver coil 241 in parallel. The second capacitor is electrically connected with the output port of the receiver coil 241 in series. The rectifier circuit 25 comprises switch elements M15, M16, M17, M18 and a capacitor C11. The switch elements M15, M16, M17 and M18 are collaboratively formed as a full-bridge rectifier circuit. The capacitor C11 is electrically connected with the output port of the full-bridge rectifier circuit in parallel. It is noted that the components of the wireless power transmission device are not restricted. In other words, the circuits with the similar functions are also feasible.

From the above descriptions, the present disclosure provides a wireless power transmission device. The transmitter coil and the receiver coil of the wireless power transmission device are used to achieve wireless power transmission. The process of adjusting the voltage from the input to the load is performed mainly by the step-down transformer or the step-up transformer. Since the difference between the turn number of the transmitter coil and the turn number of the receiver coil is small, the complexities of designing and producing the transmitter coil and the receiver coil are reduced and the fabricating cost is decreased. Since the step-down transformer or the step-up transformer can be designed and produced more easily, the electric power required by the load could be easily changed by adjusting the turn ratio of the first coil to the second coil. In other words, the step-down transformer or the step-up transformer can be varied easily according to the practical requirements of the load. Moreover, the wireless power transmission device can control the switching frequency and/or the shift phase of the inverter circuit according to the result of detecting the output voltage and/or the output current of the output DC power. Consequently, the electric power provided to the load is precisely controlled, and the efficiency is enhanced.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless power transmission device, comprising:
   a contactless transmitter unit receiving an input AC power, wherein the contactless transmitter unit comprises a transmitter coil;
   a contactless receiver unit comprising a receiver coil, wherein the receiver coil and the transmitter coil are electromagnetically coupled with each other and define a contactless transformer collaboratively, and the input AC power is electromagnetically coupled to the receiver coil through the transmitter coil, so that the input AC power is converted into a first output AC power; and
   a step-down transformer comprising a first coil and a second coil, wherein the first coil and the second coil are electromagnetically coupled with each other, the first coil is electrically connected with the receiver coil to receive the first output AC power, and a second output AC power is outputted from the second coil, wherein a turn ratio of the first coil to the second coil is larger than a turn ratio of the transmitter coil to the receiver coil.

2. The wireless power transmission device according to claim 1, further comprising a rectifier circuit, wherein the rectifier circuit is electrically connected with the second coil for rectifying the second output AC power into an output DC power.

3. The wireless power transmission device according to claim 2, wherein the rectifier circuit is a full-bridge rectifier circuit or a full-wave rectifier circuit.

4. The wireless power transmission device according to claim 1, further comprising an inverter circuit, wherein the inverter circuit is electrically connected with the contactless transmitter unit for converting an input DC power into the input AC power.

5. The wireless power transmission device according to claim 4, wherein the inverter circuit is a full-bridge inverter circuit or a half-bridge inverter circuit.

6. The wireless power transmission device according to claim 4, further comprising a rectifier circuit, wherein the rectifier circuit is electrically connected with the second coil for rectifying the second output AC power into an output DC power.

7. The wireless power transmission device according to claim 4, further comprising:
   a detecting circuit electrically connected with the rectifier circuit for detecting an output voltage and an output current of the output DC power;
   a first wireless communication unit electrically connected with the detecting unit for generating a wireless signal according to the output voltage and the output current;
   a second wireless communication unit in wireless communication with the first wireless communication unit to receive the wireless signal from the first wireless communication unit; and
   a control unit electrically connected between the second wireless communication unit and the inverter circuit, wherein the control unit receives a reference voltage, a reference current and the wireless signal and generates a control signal corresponding to at least one of a switching frequency and a shift phase of the inverter circuit.

8. The wireless power transmission device according to claim 1, wherein the contactless transmitter unit further comprises a transmitter compensation circuit electrically connected between the inverter circuit and the transmitter coil, wherein the transmitter compensation circuit receives the input AC power, compensates reactive power of the transmitter coil and reduces power capability of the input AC power.

9. The wireless power transmission device according to claim 1, wherein the contactless receiver unit further comprises a receiver compensation circuit electrically connected between the receiver coil and the first coil, wherein the receiver compensation circuit receives the first output AC power, compensates reactive power of the receiver coil and reduces power capability of the first output AC power.

10. The wireless power transmission device according to claim 1, wherein each of the transmitter coil and the receiver coil comprises a winding.

11. The wireless power transmission device according to claim 10, wherein at least one of the transmitter coil and the receiver coil further comprises a magnetic core.

12. A wireless power transmission device, comprising:
   a step-up transformer comprising a first coil and a second coil, wherein the first coil and the second coil are electromagnetically coupled with each other, the second coil receives a first input AC power, and a second input AC power is outputted from the first coil;

a contactless transmitter unit electrically connected with the first coil to receive the second input AC power, wherein the contactless transmitter unit comprises a transmitter coil; and a contactless receiver unit comprising a receiver coil, wherein the receiver coil and the transmitter coil are electromagnetically coupled with each other and define a contactless transformer collaboratively, and the second input AC power is electromagnetically coupled to the receiver coil through the transmitter coil, so that the second input AC power is converted into an output AC power, wherein a turn ratio of the first coil to the second coil is larger than a turn ratio of the receiver coil to the transmitter coil.

13. The wireless power transmission device according to claim 12, further comprising an inverter circuit, wherein the inverter circuit is electrically connected with the second coil for converting an input DC power into the first input AC power.

14. The wireless power transmission device according to claim 13, wherein the inverter circuit is a full-bridge inverter circuit or a half-bridge inverter circuit.

15. The wireless power transmission device according to claim 12, further comprising a rectifier circuit, wherein the rectifier circuit is electrically connected with the contactless receiver unit for rectifying the output AC power into an output DC power.

16. The wireless power transmission device according to claim 15, wherein the rectifier circuit is a full-bridge rectifier circuit.

17. The wireless power transmission device according to claim 12, wherein the contactless transmitter unit further comprises a transmitter compensation circuit between the transmitter coil and the first coil, wherein the transmitter compensation circuit receives the second input AC power, compensates reactive power of the transmitter coil and reduces power capability of the second input AC power.

18. The wireless power transmission device according to claim 12, wherein the contactless receiver unit further comprises a receiver compensation circuit, and the receiver compensation circuit is electrically connected with the receiver coil, wherein the receiver compensation circuit receives the output AC power, compensates reactive power of the receiver coil and reduces power capability of the output AC power.

* * * * *